United States Patent
Mihara et al.

(10) Patent No.: US 12,145,614 B2
(45) Date of Patent: Nov. 19, 2024

(54) DISPLAY CONTROL DEVICE, DISPLAY DEVICE, DISPLAY CONTROL METHOD, AND NON-TRANSITORY COMPUTER-READABLE RECORDING MEDIUM

(71) Applicant: JVCKENWOOD Corporation, Yokohama (JP)

(72) Inventors: Masaya Mihara, Yokohama (JP); Yasuhisa Oki, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 196 days.

(21) Appl. No.: 17/724,515

(22) Filed: Apr. 20, 2022

(65) Prior Publication Data
US 2022/0242435 A1     Aug. 4, 2022

Related U.S. Application Data

(63) Continuation of application No. PCT/JP2020/048104, filed on Dec. 23, 2020.

(30) Foreign Application Priority Data

Dec. 24, 2019  (JP) .................... 2019-232447

(51) Int. Cl.
  *B60W 50/00* (2006.01)
  *B60K 35/00* (2006.01)
  (Continued)

(52) U.S. Cl.
  CPC ............. *B60W 50/14* (2013.01); *B60K 35/00* (2013.01); *B60K 35/28* (2024.01); *B60K 35/29* (2024.01); *B60K 35/81* (2024.01); *B60K 2360/176* (2024.01); *B60K 2360/179* (2024.01); *B60K 2360/1868* (2024.01); *B60W 2050/146* (2013.01); *B60W 2554/4041* (2020.02); *B60W 2554/80* (2020.02)

(58) Field of Classification Search
  CPC ............. B60K 35/00; B60K 2370/176; B60K 2370/179; B60K 2370/1868;
  (Continued)

(56) References Cited

U.S. PATENT DOCUMENTS

| 2004/0215373 A1* | 10/2004 | Won | G08G 1/161 701/1 |
| 2006/0291482 A1* | 12/2006 | Evans | H04W 40/246 370/406 |

(Continued)

FOREIGN PATENT DOCUMENTS

| CN | 107117174 B | * | 6/2019 | ............ B60W 30/09 |
| DE | 102013010818 A1 | * | 12/2013 | ............ G01C 21/365 |

(Continued)

OTHER PUBLICATIONS

International Search Report and Written Opinion for International Application No. PCT/JP2020/048104 mailed on Mar. 16, 2021, 9 pages.

*Primary Examiner* — Mark S Rushing

(74) *Attorney, Agent, or Firm* — Amin, Turocy & Watson, LLP

(57) ABSTRACT

A display control device includes a vehicle-information acquiring unit and a display control unit. The vehicle-information acquiring unit is configured to acquire information on at least one nearby vehicle close to a vehicle. The display control unit is configured to display an image showing the nearby vehicle based on the information on the nearby vehicle. The display control unit displays, in a switching manner, a first image showing the nearby vehicle and a second image showing the nearby vehicle having a smaller amount of information than the first image.

12 Claims, 8 Drawing Sheets

(51) Int. Cl.
 B60W 50/14 (2020.01)
 *B60K 35/28* (2024.01)
 *B60K 35/29* (2024.01)
 *B60K 35/81* (2024.01)

(58) Field of Classification Search
 CPC .......... B60K 2370/193; B60K 2370/52; B60K 2370/154; B60K 2370/166; B60K 2370/171; B60K 37/02; B60W 50/14; B60W 2050/146; B60W 2554/4041; B60W 2554/80; G01C 21/36; G08G 1/16
 See application file for complete search history.

(56) References Cited

U.S. PATENT DOCUMENTS

| 2011/0214178 | A1* | 9/2011 | van den Berg ..... H04W 12/122 726/22 |
| 2012/0108163 | A1* | 5/2012 | Bai ....................... H04L 12/189 455/3.06 |
| 2012/0239286 | A1* | 9/2012 | Mizuguchi ............. G08G 1/162 701/301 |
| 2015/0070193 | A1* | 3/2015 | Anschutz .............. H04W 8/005 340/903 |
| 2017/0154554 | A1* | 6/2017 | Tanaka ................... G08G 1/166 |
| 2017/0330463 | A1* | 11/2017 | Li .......................... B60K 35/50 |
| 2019/0047561 | A1 | 2/2019 | Nishiguchi et al. |
| 2020/0027351 | A1* | 1/2020 | Gotoda ............. B60W 60/0016 |
| 2020/0051435 | A1 | 2/2020 | Hashimoto et al. |

FOREIGN PATENT DOCUMENTS

| JP | 2015-108519 | 6/2015 |
| JP | 2017-037634 | 2/2017 |
| JP | 2019-036086 | 3/2019 |
| JP | 2019-040630 | 3/2019 |
| WO | 2018/088224 | 5/2018 |

* cited by examiner

MANUALLY-OPERATED DRIVING IMAGE

FIRST IMAGE

FIRST IMAGE

SECOND IMAGE

DISPLAY CONTROL DEVICE, DISPLAY DEVICE, DISPLAY CONTROL METHOD, AND NON-TRANSITORY COMPUTER-READABLE RECORDING MEDIUM

CROSS-REFERENCE TO RELATED APPLICATIONS

This application is a Continuation of PCT International Application No. PCT/JP2020/048104 filed on Dec. 23, 2020 which claims the benefit of priority from Japanese Patent Application No. 2019-232447 filed on Dec. 24, 2019, the entire contents of which are incorporated herein by reference.

BACKGROUND

The present disclosure relates to a display control device, a display device, a display control method, and a non-transitory computer-readable recording medium.

A display control device that displays surroundings of its own vehicle on an in-vehicle display device has been known. For example, JP-A-2015-108519 describes that display of map information is switched according to consciousness of the vehicle's occupant during automated driving. Moreover, in such a display control device for vehicles, there is a case in which display of information on a vehicle around its own vehicle is demanded.

However, when an amount of information on a surrounding vehicle is too small, an occupant may not be able to appropriately determine surrounding conditions, and conversely, when an amount of information on a surrounding vehicle is too much, it may be rather obtrusive for the occupant. There is room for improvement in order to display information on a surrounding vehicle. That is, it is desired that a display control device for vehicles appropriately displays information on a surrounding vehicle according to a situation.

SUMMARY

A display control device according to an aspect of the present disclosure includes a vehicle-information acquiring unit and a display control unit. The vehicle-information acquiring unit is configured to acquire information on at least one nearby vehicle close to a vehicle. The display control unit is configured to display an image showing the nearby vehicle based on the information on the nearby vehicle. The display control unit displays, in a switching manner, a first image showing the nearby vehicle and a second image showing the nearby vehicle having a smaller amount of information than the first image.

A display device according to an aspect of the present disclosure includes: the display control device described above; and a display unit that is mounted on the vehicle, and that is configured to display the first image and the second image in a switching manner.

A display method according to an aspect of the present disclosure includes: acquiring information on at least one nearby vehicle close to a vehicle; and displaying an image showing the nearby vehicle based on the information on the nearby vehicle. The displaying includes displaying, in a switching manner, a first image showing the nearby vehicle and a second image showing the nearby vehicle having a smaller amount of information than the first image.

A non-transitory computer-readable recording medium according to an aspect of the present disclosure contains a computer program. The computer program causes a computer to execute: acquiring information on at least one nearby vehicle close to a vehicle; and displaying an image showing the nearby vehicle based on the information on the nearby vehicle. The displaying includes displaying, in a switching manner, a first image showing the nearby vehicle and a second image showing the nearby vehicle having smaller amount of information than the first image.

The above and other objects, features, advantages and technical and industrial significance of this invention will be better understood by reading the following detailed description of presently preferred embodiments of the invention, when considered in connection with the accompanying drawings.

DETAILED DESCRIPTION

Hereinafter, a present embodiment will be explained in detail with reference to the drawings. The embodiment explained below is not intended to limit embodiments.

Figure 1:
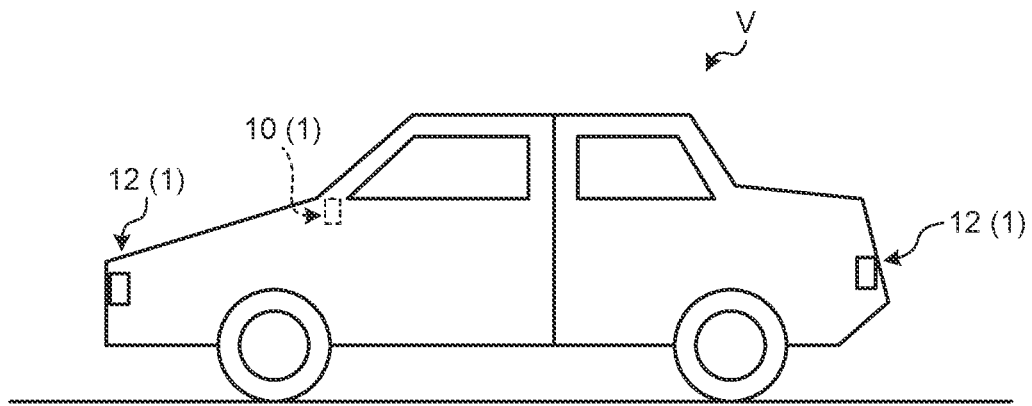
FIG. 1 is a schematic diagram of a vehicle according to a present embodiment.

FIG. 1 is a schematic diagram of a vehicle according to the present embodiment. A vehicle V according to the present embodiment is a vehicle configured to enable automated driving. Furthermore, the vehicle V is configured to be switchable between manually operated driving and automated driving. The manually operated driving refers to a driving mode in which an occupant operates the vehicle V to drive the vehicle V. The automated driving refers to a driving mode in which the vehicle V automatically travels without being operated by an occupant. The automated driving in the present embodiment also includes a mode in which an occupant performs at least a part of driving. That is, the automated driving in the present embodiment includes Level 1 to Level 5 defined by the Society of Automotive Engineers (SAE) International. Furthermore, the automated driving in the present embodiment is preferable to be at least one of Level 3 to Level 5, and is more preferable to be at least one of Level 3 and Level 4. The manually operated driving and the automated driving can be switched, for example, depending on an occupant.

A display system 1 according to the present embodiment is a system that is mounted on the vehicle V, and displays an image inside the vehicle V. Inside the vehicle V means in a vehicle interior in which, for example, seats for occupants are provided. In the present embodiment, the display system 1 includes a display device 10 and a detecting device 12. The display device 10 includes a display unit 22 described later, and causes the display unit 22 to display an image. The detecting device 12 is a sensor that is provided in the vehicle V, and that detects surroundings of the vehicle V. More specifically, the detecting device 12 detects a nearby vehicle that is a vehicle close to the vehicle V, that is, whether there is a vehicle close to the vehicle V. The nearby vehicle herein refers to a vehicle within a predetermined detection distance from the vehicle V, and can be regarded as a vehicle present near the vehicle V. In more detail, the detecting device 12 detects a position of a nearby vehicle with respect to the vehicle V, and a distance between the vehicle V and the nearby vehicle. That is, the detecting device 12 detects in which direction and how far a nearby vehicle is from to the vehicle V. The detecting device 12 is, for example, a light detection and ranging (LIDAR) sensor, but it is not limited thereto, and may be any device such as an imaging device. Moreover, the number of detecting devices 12, and a mounting position of the detecting device 12 on the vehicle V are also arbitrarily.

Figure 2:
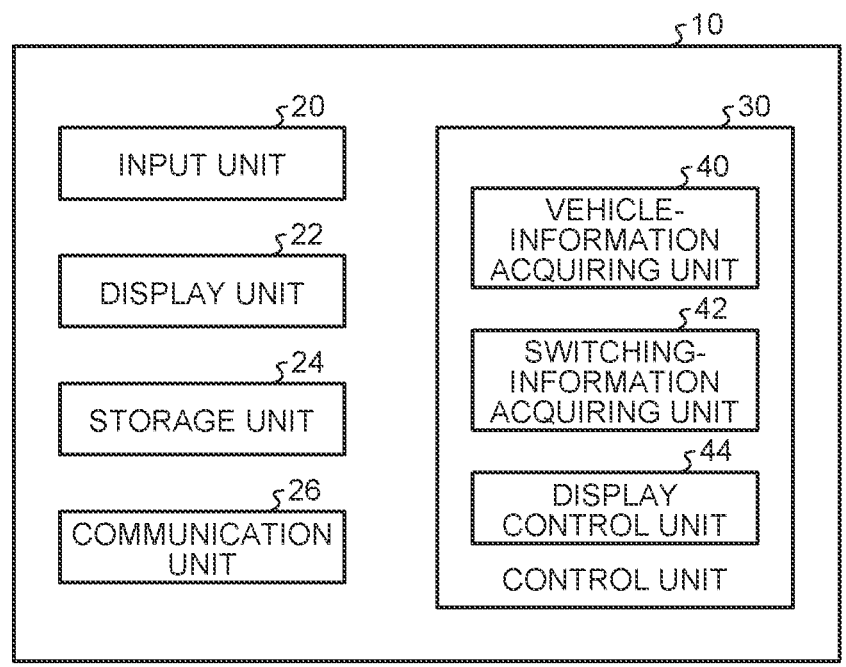
FIG. 2 is a schematic block diagram of a display device according to the present embodiment.
Figure 3:
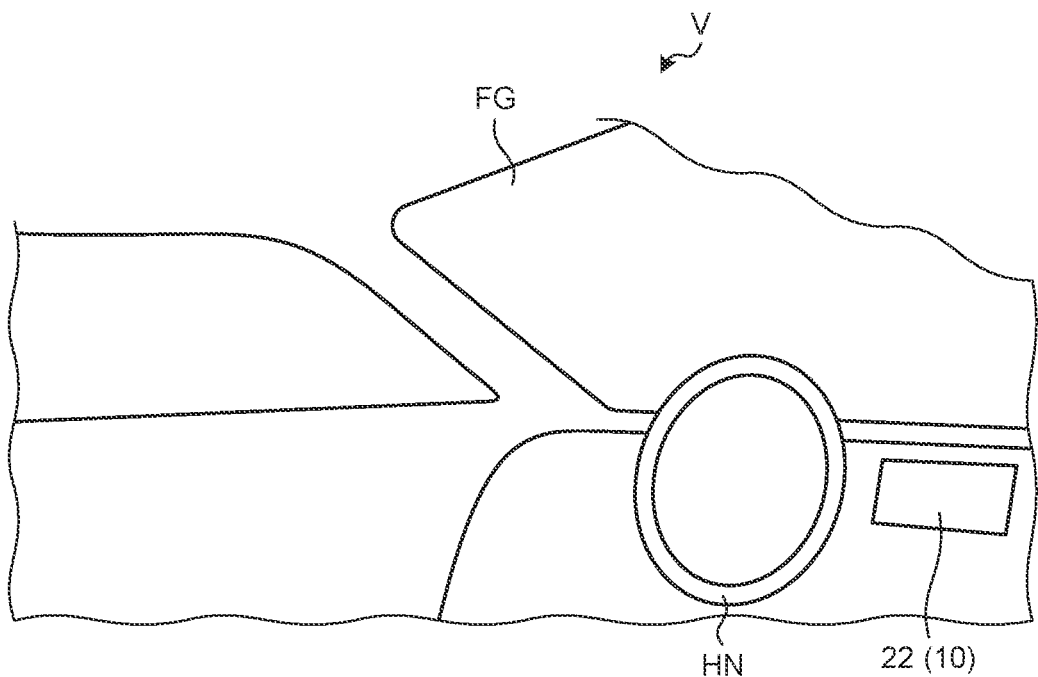
FIG. 3 is a schematic diagram illustrating an interior of the vehicle according to the present embodiment.

The display device 10 is provided on the vehicle V. FIG. 2 is a schematic block diagram of the display device according to the present embodiment. FIG. 3 is a schematic diagram illustrating an interior of the vehicle according to the present embodiment. As illustrated in FIG. 2, the display device 10 includes an input unit 20, the display unit 22, a storage unit 24, a communication unit 26, and a control unit 30. The input unit 20 is a device that receives an operation made by an occupant and is, for example, a touch panel, an operating button, and the like. The display unit 22 is a display that displays an image. As illustrated in FIG. 3, the display unit 22 is provided inside the vehicle V. The vehicle V includes a front glass FG, a steering wheel HN, and the like. The front glass FG is also called front window or windshield glass. The steering wheel HN is a wheel operated by a driver. The display unit 22 is provided at a position viewable by the driver, for example, on a lower side of the front glass FG in a vertical direction. However, the position at which the display unit 22 is provided may be any position. The display unit 22 may be provided, for example, on the front glass FG, a side glass, or the like as so-called head-up display.

The storage unit 24 illustrated in FIG. 2 is a memory that stores therein various kinds of data such as calculation contents and programs, and includes, at least one of a main storage device such as a random access memory (RAM) and a read only memory (ROM), and external storage device such as a hard disk drive (HDD). The communication unit 26 is a communication module that performs communication with an external device such as the detecting device 12, and is, for example, an antenna or the like.

The control unit 30 serving as an image processing device is an arithmetic device such as a central processing unit (CPU). The control unit 30 includes a vehicle-information acquiring unit 40, a switching-information acquiring unit 42, and a display control unit 44. The control unit 30 reads out and executes a program (software) from the storage unit 24, to implement the vehicle-information acquiring unit 40, the switching-information acquiring unit 42, and the display control unit 44, and performs processing thereby. The control unit 30 may perform the processing by a single CPU, or may include plural CPUs, and may perform the processing by the plural CPUs. Moreover, at least a part of the vehicle-information acquiring unit 40, the switching-information acquiring unit 42, and the display control unit 44 may be implemented by a hardware circuit.

The vehicle-information acquiring unit 40 acquires information on a nearby vehicle. The vehicle-information acquiring unit 40 controls the detecting device 12, and causes the detecting device 12 to acquire information on a nearby vehicle. The vehicle-information acquiring unit 40 acquires information on a nearby vehicle detected by the detecting device 12. In the present embodiment, the vehicle-information acquiring unit 40 acquires a position of a nearby vehicle with respect to the vehicle V, and a distance between the vehicle V and the nearby vehicle as the information on a nearby vehicle. Moreover, the vehicle-information acquiring unit 40 may acquire information other than the information on a nearby vehicle. For example, the vehicle-information acquiring unit 40 acquires terrestrial coordinates of the vehicle V, map information, and the like by communicating with a global positioning system (GPS).

In the present embodiment, the vehicle-information acquiring unit 40 acquires the information on a nearby vehicle from the detecting device 12, but an acquiring method of the information on a nearby vehicle is not limited thereto. The vehicle-information acquiring unit 40 may acquire the information on a nearby vehicle from an external device not provided in the vehicle V. For example, the vehicle-information acquiring unit 40 may communicate with GPS and acquire the information on a nearby vehicle from GPS. Moreover, when a sensor that detects vehicles is provided on a road or the like, the vehicle-information acquiring unit 40 may acquire the information on a nearby vehicle from this sensor.

The switching-information acquiring unit 42 acquires switching information. The switching information is information for the display control unit 44 to determine whether to switch images displayed on the display unit 22. The switching-information acquiring unit 42 acquires driving mode information and driving condition information as the switching information. The driving mode information is information indicating a driving mode of the vehicle V. That is, the switching-information acquiring unit 42 acquires information indicating whether the vehicle V is in the manually-operated driving mode or an automatic driving mode as the driving mode information. The switching-information acquiring unit 42 acquires the driving mode information indicating that it is in the manually-operated driving mode when the vehicle V is currently set to the manually-operated driving mode, and acquires the driving mode information indicating that it is in the automatic driving mode when the vehicle V is currently set to the automatic driving mode.

The driving state information is information indicating a driving state in which the vehicle V is traveling. The switching-information acquiring unit 42 acquires, as the driving state information, information indicating whether the vehicle V is in a first state or a second state. The first state refers to a state in which the vehicle V is traveling in the automatic driving mode in a situation where the occupant feels anxious about automated driving. The second state is a state in which the vehicle V is traveling in the automatic driving mode in a situation where the degree of anxiety of the occupant about the automated driving is smaller than that in the first state. That is, the second state refers to a state in which the vehicle V is traveling in the automatic driving mode in a situation where the occupant has less anxiety about the automated driving.

The switching-information acquiring unit 42 may acquire the information on whether the vehicle V is in the first state or the second state by any method. For example, the information on whether the vehicle V is in the first state or the second state may be input to the input unit 20 or the like. In this case, for example, when the occupant feels anxious about automated driving, the occupant inputs to the input unit 20 or the like that the vehicle V is in the first state. When the occupant does not feel anxious about the automated driving, the occupant inputs that the vehicle V is in the second state. The switching-information acquiring unit 42 acquires the information on whether the vehicle V is in the first state or the second state by detecting the input of the occupant. The input to the input unit 20 is not limited to two scales of being the first state or the second state, but it may be any number of scales of two or more. The input unit 20 is preferably a device capable of inputting an arbitrary number of scales of two or more, such as a dial, a lever, multiple buttons (but may be a single button in the case of two scales), and a touch panel. When the number of scales exceeds two, whether the vehicle V is in the first state or the second state may be determined based on whether it is equal to or higher than a threshold, using a scale determined in advance for each occupant as the threshold.

Moreover, for example, the switching-information acquiring unit 42 may acquire the information indicating whether the vehicle V is in the first state or the second state based on biological information on the occupant. In this case, for example, the display system 1 includes a sensor that detects biological information on an occupant, and the switching-information acquiring unit 42 determines whether the vehicle V is in the first state or the second state from a detection result of biological information on the occupant acquired by this sensor. For example, the sensor may be configured to measure a heart rate of an occupant. In this case, the switching-information acquiring unit 42 may determine as the first state, regarding that the occupant feels anxious about automated driving when the heart rate of the occupant measured by the sensor is equal to or higher than a threshold, and may determine as the second state, regarding that the occupant does not feel anxious about the automated driving when the heart rate of the occupant is lower than the threshold. Furthermore, for example, the sensor may be configured to detect a line of sight of the occupant. In this case, the switching-information acquiring unit 42 may determine as the first state when time for which the line of sight of the occupant detected by the sensor is directed to outside the vehicle is equal to or longer than a threshold, or a frequency of changing directions of the line of sight is equal to or higher than a threshold, and may determine as the second state when time for which the line of sight of the occupant is directed outside the vehicle is shorter than the threshold or when the frequency of changing directions of the line of sight is lower than the threshold. Moreover, for example, the sensor may be configured to detect whether the occupant is touching an operating device to drive the vehicle V, such as the steering wheel HN, a brake pedal, and a gas pedal. In this case, the switching-information acquiring unit 42 may determine as the first state when time for which the occupant is touching the operating device is equal to or longer than a threshold, and may determine as the second state when time for which the occupant is touching the operating device is shorter than the threshold.

Furthermore, for example, the switching-information acquiring unit 42 may acquire the information whether the vehicle V is in the first state or the second state based on a place in which the vehicle V is driving. In this case, the switching-information acquiring unit 42 acquires information on a place in which the vehicle V is driving. For example, the switching-information acquiring unit 42 acquires terrestrial coordinates of the vehicle V from GPS, and detects a place in which the vehicle V is currently driving based on map information and the terrestrial coordinates of the vehicle V. The switching-information acquiring unit 42 determines whether the vehicle V is in the first state or the second state from the place in which the vehicle V is currently driving. For example, the switching-information acquiring unit 42 may determine as the first state when the vehicle V is driving in a new place for the first time, and may determine as the second state when the vehicle V is driving in a place driven before. The place driven before is preferable to be a place on a route traveling through steadily, for example, home, office, school, and the like. Moreover, a place determined as the first state and a place determined as the second state may be set in advance. These places set in advance may be set as a place on a predetermined route, as a place within a range of a predetermined distance from an arbitrary point, a place within a range of an arbitrary administrative district, a place within a range surrounded by arbitrary roads, and the like. In this case, the switching-information acquiring unit 42 may determine as the first state when the vehicle V is driving in the place determined as the first state, and may determine as the second state when the vehicle V is driving in the place determined as the second state. Furthermore, for example, the switching-information acquiring unit 42 may determine whether the vehicle V is in the first state or the second state based on the information on a nearby vehicle acquired by the vehicle-information acquiring unit 40. For example, the switching-information acquiring unit 42 may determine as the first state when the number of nearby vehicles is equal to or larger than a threshold, and may determine as the second state when the number of nearby vehicles is smaller than the threshold.

Figure 4:
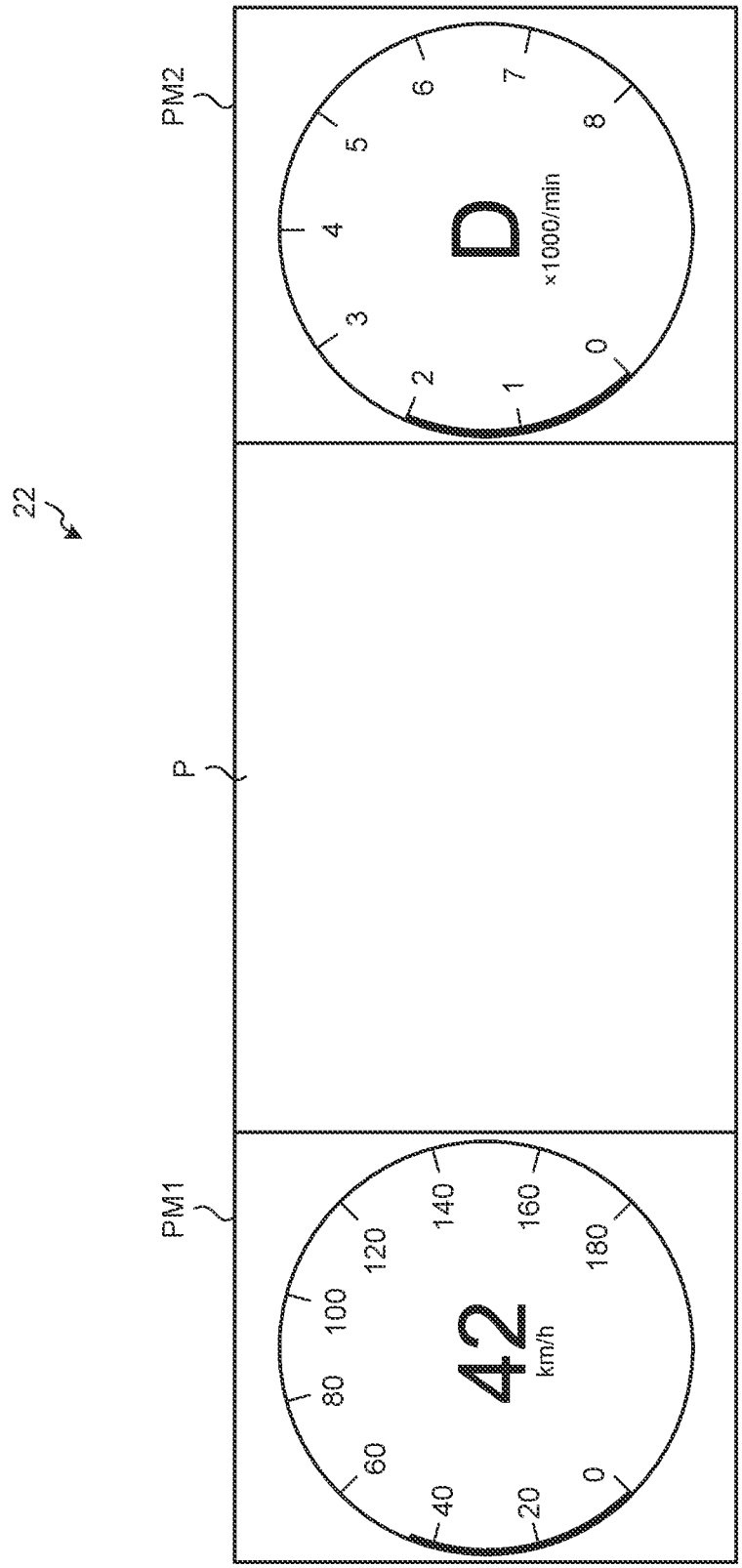
FIG. 4 is a diagram illustrating an example of an image displayed on a display unit.

FIG. 4 is a diagram illustrating an example of an image displayed on the display unit. The display control unit 44 causes the display unit 22 to display an image. As illustrated in FIG. 4, in the present embodiment, the display control unit 44 causes the display unit 22 to display images P, PM1, and PM2. The image P is an image indicating a driving situation of the vehicle V. The image indicating the driving situation of the vehicle V is an image showing in what situation the vehicle V is driving, in other words, surroundings of the vehicle V. Display contents of the image P will be described later. The image PM1 and PM2 are images showing a driving condition of the vehicle V. In the example in FIG. 4, the image PM 1 is a speedometer indicating the speed of the vehicle V, and the image PM2 is an image indicating the number of revolutions of the engine of the vehicle V. The display control unit 44 simultaneously displays the images P, PM1, and PM2 on one screen. For example, the display control unit 44 displays the images P, PM1, and PM2 such that the image P is positioned between the image PM1 and the image PM2. However, the display control unit 44 is not limited to displaying the images P, PM1, and PM2 on one screen. For example, the display control unit 44 may display only the image P on one screen, or may display the image P side by side with an image showing another information.

The display control unit 44 causes the display unit 22 to display the image P based on the information on a nearby vehicle acquired by the vehicle-information acquiring unit 40. Moreover, the display control unit 44 switches display contents of the image P based on the switching information acquired by the switching-information acquiring unit 42. Hereinafter, the image P will be explained in more detail.

The display control unit 44 switches display contents of the image P based on the driving mode information in the switching information. Specifically, when the driving mode information indicates that the vehicle V is in the manually-operated driving mode, the display control unit 44 displays a manually operated driving image PA as the image P. When the vehicle V is in the automatic driving mode, the display control unit 44 displays a first image PB or a second image PC as the image P. The first image PB and the second image PC are images showing a nearby vehicle.

Figure 5:
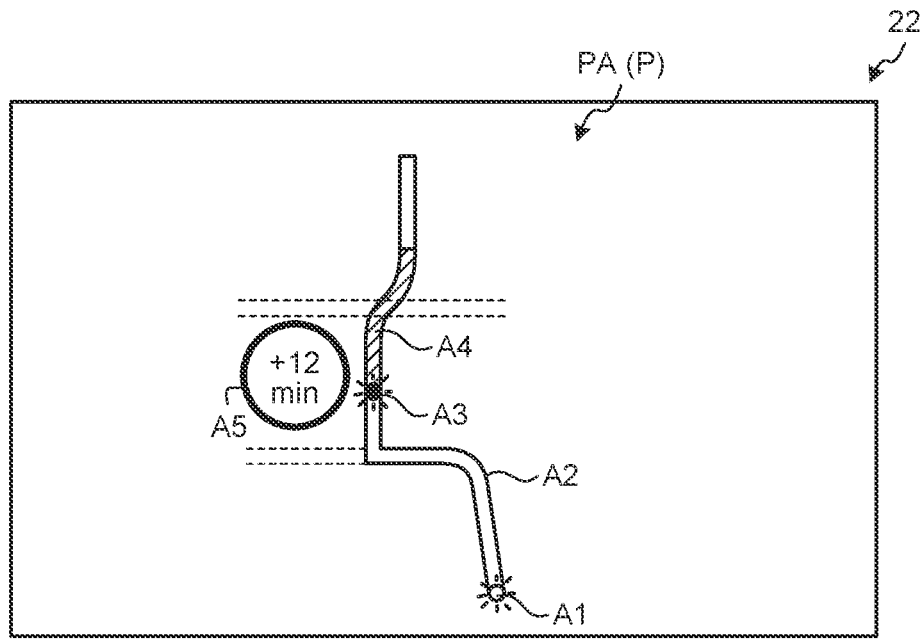
FIG. 5 is a diagram illustrating an example of a manually-operated driving image.

FIG. 5 is a diagram illustrating an example of a manually-operated driving image. The manually-operated driving image PA is a so-called navigation screen that displays a traveling route of the vehicle V. The display control unit 44 displays route information that shows a route on which the vehicle V travels, and own position information indicating a position of the vehicle V on the route, as the manually-operated driving image PA. More specifically, the manually-operated driving image PA includes an own position image A1, a route image A2, an accident position image A3, a traffic-jam route image A4, and a delay time image A5.

The own position image A1 is an image indicating a position of the vehicle V on a route on which the vehicle V travels, and can be regarded as own position information. The route image A2 is an image indicating a route on which the vehicle V travels, and can be regarded as route information. The display control unit 44 generates the own position image A1 and the route image A2 based on terrestrial coordinates of the vehicle V acquired by the vehicle-information acquiring unit 40 and map information, to display those images on the display unit 22. For example, the display control unit 44 sets a route of the vehicle V from a destination of the vehicle V set by an occupant and map information, and displays the set route as the route image A2. The display control unit 44 detects a current position of the vehicle V on the route from terrestrial coordinates of the vehicle V, and displays a current position of the vehicle V on the route as the own position image A1. The route of the vehicle V is not limited to be set by the display control unit 44, and the display control unit 44 may acquire, for example, information on a route set by the control device of the vehicle V, to display as the route image A2.

The own position image A1 is displayed so as to be superimposed on the route image A2. Because the position of the current position of the vehicle V is a start point of the route at the present time, the own position image A1 is shown as an image of a route connecting the own position image A1 and an end point of the route. Moreover, the display of the route image A2 is updated so as to be scrolled in a traveling direction of the vehicle V as the vehicle V travels.

The accident position image A3 is an image indicating, when a traffic accident occurs on the route on which the vehicle V is travelling, a position at which the traffic accident has occurred on the route on which the vehicle V is traveling. The accident position image A3 is displayed so as to be superimposed on the route image A2. The display control unit 44 acquires information on the position at which the traffic accident has occurred, for example, from an external device, generates the accident position image A3 based on the information, and causes the display unit 22 to display it.

The traffic jam route image A4 is an image indicating an area that is jammed in the route on which the vehicle V is travelling. The traffic-jam route image A4 is displayed so as to be superimposed on the route image A2. The traffic-jam route image A4 is displayed in a distinguishable manner from the route image A2 having no traffic jam, in other words, with a display content different from the route image A2 having no traffic jam. For example, the traffic-jam route image A4 is displayed in a different color from the route image A2 having no traffic jam. The display control unit 44 acquires information on a traffic jam area, for example, from an external device, and generates and displays the traffic-jam route image A4 based on the information.

The delay time image A5 shows delay time of a current expected arrival time from an initial expected arrival time. For example, the initial expected arrival time is an expected arrival time when a traffic jam is not taken into consideration, and the current expected arrival time is an expected arrival time when the traffic jam is taken into consideration. The display control unit 44 calculates a latest expected arrival time from the information on a traffic jam area and the like, and calculates a difference between the calculated expected arrival time and the initial expected arrival time. The display control unit 44 displays this difference as the delay time image A5.

The display control unit 44 causes the display unit 22 to display the manually-operated driving image PA in this way, but the manually-operated driving image PA described above is only one example, and the display contents of the manually-operated driving image PA are not limited to what is explained above.

Figure 6:
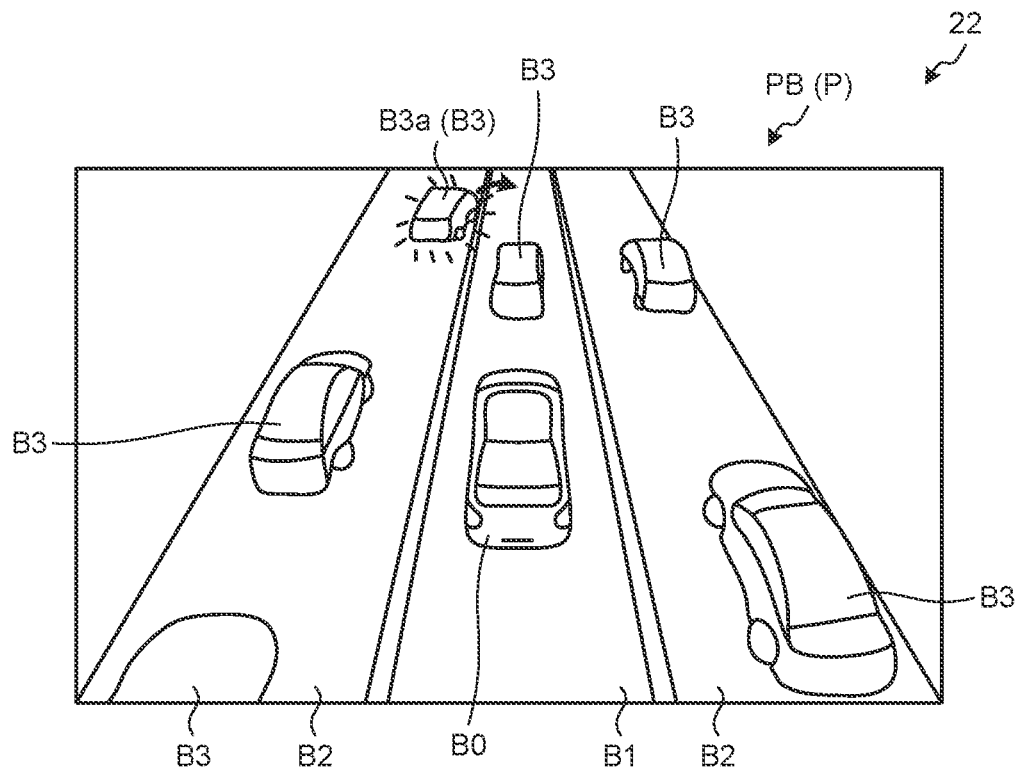
FIG. 6 is a diagram illustrating an example of a first image.
Figure 7:
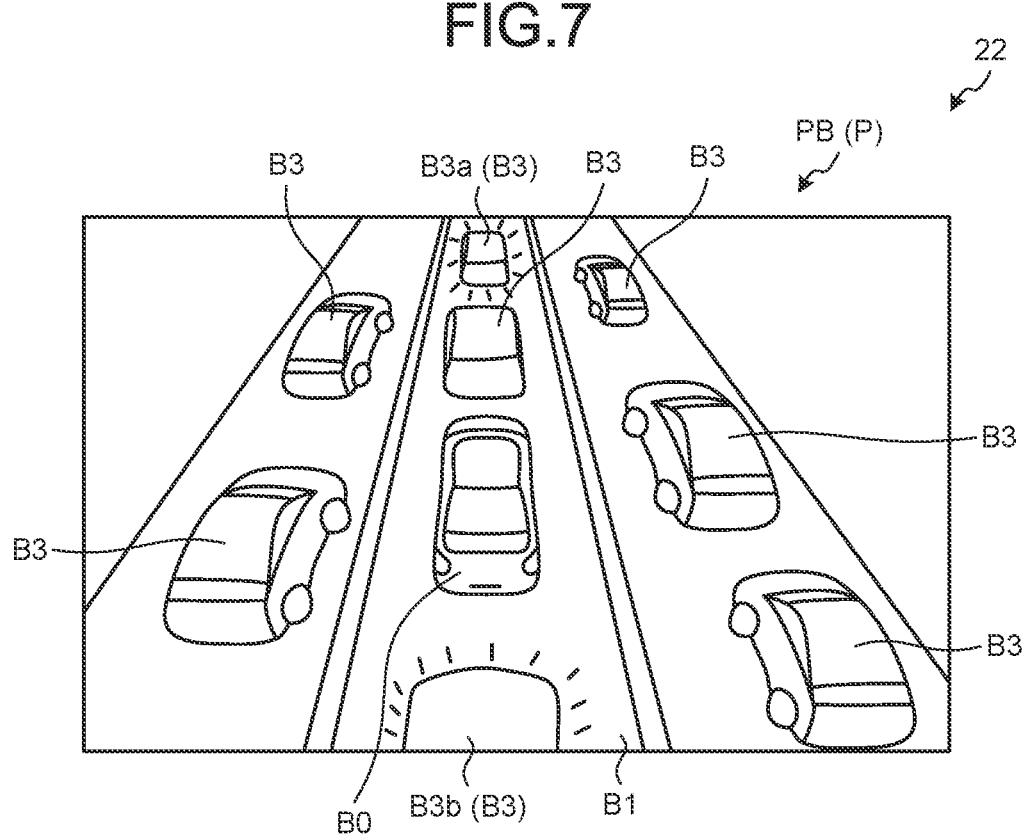
FIG. 7 is a diagram illustrating an example of the first image.

FIG. 6 and FIG. 7 are diagrams illustrating an example of the first image. The display control unit 44 displays the first image PB or the second image PC when the driving mode information in the switching information indicates that the vehicle V is in the automatic driving mode. To be more specific, the display control unit 44 causes the display unit 22 to display the first image PB when the vehicle is in the automatic driving mode and the driving state information in the switching information indicates the first state. That is, the display control unit 44 displays the first image PB when the vehicle V is driving in the automatic driving mode, and the occupant feels anxious about the automated driving. The first image PB is an image showing nearby vehicles. In the following, the first image PB will be specifically explained.

The display control unit 44 generates the first image PB based on the information on a nearby vehicle acquired by the vehicle-information acquiring unit 40, and causes the display unit 22 to display it. As illustrated in FIG. 6, the first image PB is displayed as a bird's-eye view image. The bird's-eye view image refers to an image assuming that the vehicle V and a nearby vehicle are viewed from a viewpoint looking down on the vehicle V from above in a vertical direction. The display control unit 44 detects a positional relation between the vehicle V and the nearby vehicle based on a position of the nearby vehicle relative to the vehicle V and a distance between the vehicle V and the nearby vehicle. The display control unit 44 generates a bird's-eye view image assuming that the vehicle V and the nearby vehicle are viewed from a viewpoint looking down from above in a vertical direction, as the first image PB, and causes the display unit 22 to display it. Because the display image PB is a bird's-eye view image, in addition to an image on a nearby vehicle positioned within a range in a forward direction (direction of travel) in a traveling direction of the vehicle V, a nearby vehicle positioned within a range in a backward direction (opposite side to the direction of travel) in the traveling direction of the vehicle V is also included.

The first image PB includes a own vehicle image B0, an own lane image B1, side lane images B2, and nearby vehicle images B3. The own vehicle image B0 is an image showing the vehicle V. The own lane image B1 is an image indicating a route on which the vehicle V is driving. The side lane images B2 are images indicating routes in sideward directions of the route on which the vehicle V is driving. Each of the nearby vehicle images B3 is an image showing a nearby vehicle. The sideward directions herein denote sideward directions when a traveling direction of the vehicle V is a front direction. Although the own lane image B1 and the side lane images B2 show lanes of an identical direction in FIG. 6, they may be lanes of opposite directions, not limited to an identical direction.

The display control unit 44 displays the own vehicle image B0 so as to be superimposed on the own lane image B1. For example, the own vehicle image B0 is displayed as an image representing a shape of a vehicle on the own lane image B1. The display control unit 44 may acquire the information on a route of the vehicle V, and may generate and display the own vehicle image B0, the own lane image B1, and the side lane image B2 based on the information on the route. A position of the own vehicle image B0 in the first image PB may be fixed, and at least one of the own lane image B1, the side lane image B2, and the nearby vehicle image B3 may vary so as to move relatively to the own vehicle image B0 as the vehicle V travels. The position at which the own vehicle image B0 is fixed in the first image PB is not limited to a portion near the center of the first image PB, but it may be fixed at a position shifted to the left or right from the center, and a fixing position may be determined based on a lane in which the own vehicle is running, the number of lanes, the number of running vehicles, and the like so that an amount of information to be displayed in the first image PB increases.

The display control unit 44 displays the nearby vehicle image B3 so as to be superimposed on the own lane image B1 or the side lane image B2. For example, the nearby vehicle image B3 is displayed as an image representing a shape of a vehicle. The display control unit 44 calculates a position of the nearby vehicle relative to the vehicle V in the first image PB based on the positional relation between the vehicle V and the nearby vehicle. The display control unit 44 then displays the nearby vehicle image B3 at the position of the nearby vehicle calculated in the first image PB. As described above, a vehicle present within a predetermined detection distance with respect to the vehicle V is detected as a nearby vehicle. In this case, the display control unit 44 may display, as the nearby vehicle images B3, all of vehicles present within the range of the detection distance relative to the vehicle V, that is, all of detected nearby vehicles. The display control unit 44 may display, as the nearby vehicle image B3, a nearby vehicle within a predetermined distance range smaller than the detection distance range relative to the vehicle V. For example, when the number of vehicles in the detection distance range is equal to or more than a predetermined number, or when a speed of the vehicle V is lower than a predetermined value, the display control unit 44 may display, as the nearby vehicle images B3, nearby vehicles in the predetermined distance range smaller than the detection distance range. In either case, as illustrated in FIG. 6, the display control unit 44 displays nearby vehicles both ahead in the traveling direction in the own vehicle image B0 and behind in the traveling direction of the vehicle V, as the nearby vehicle images B3. That is, the display control unit 44 displays nearby vehicles positioned in all directions relative to the vehicle V, as the nearby vehicle images B3.

Moreover, the display control unit 44 detects a dangerous vehicle, and displays the dangerous vehicle in a different display content from the nearby vehicle. The dangerous vehicle refers to a nearby vehicle that increases a risk of collision of the vehicle V with another vehicle. For example, the display control unit 44 determines a nearby vehicle having a risk of colliding with the vehicle V as the dangerous vehicle. Hereinafter, among the dangerous vehicles, the dangerous vehicle having a risk of colliding with the vehicle V will be appropriately referred to as a first dangerous vehicle. The display control unit 44 may determine a nearby vehicle whose distance to the vehicle V is equal to or smaller than a threshold, as the first dangerous vehicle. Moreover, for example, the display control unit 44 may determine a nearby vehicle that is approaching the vehicle V and whose distance to the vehicle V is equal to or less than a threshold, as the first dangerous vehicle. To be more specific, the display control unit 44 may determine a nearby vehicle whose relative speed with respect to the vehicle V is equal to or higher than a threshold, that is approaching the vehicle V, and whose distance to the vehicle V is equal to or less than a threshold, as the first dangerous vehicle. Because the first dangerous vehicle as described has a risk of colliding with the vehicle V, the display control unit 44 displays it in a different display content from the other nearby vehicles so that the occupant can easily recognize it. The determining method of the first dangerous vehicle is not limited thereto.

Moreover, the display control unit 44 determines a nearby vehicle that may cause a collision between another nearby vehicle and the vehicle V due to the behavior thereof, as a dangerous vehicle. Hereinafter, among dangerous vehicles, a dangerous vehicle that may cause a collision between another nearby vehicle and the vehicle V is appropriately referred to as a second dangerous vehicle. For example, when a vehicle that enters a lane in which the vehicle V is running from another lane is present ahead, the vehicle V may brake to keep a distance with the vehicle. In such a case, a distance between the vehicle V and a vehicle behind is shortened, and a risk of collision between the vehicle V and the vehicle behind increases. Therefore, when there is a vehicle entering the lane in which the vehicle V is running from the other lane ahead, the vehicle may be determined as the second dangerous vehicle. In this case, for example, when the display control unit 44 detects that a nearby vehicle traveling ahead of the vehicle V in the lane on a side of the vehicle V is moving to the lane of the vehicle V, the display control unit 44 determine the vehicle as the second dangerous vehicle. Moreover, for example, when there is a vehicle that is running several vehicles ahead in the same lane as the vehicle V, and that suddenly slows down, the display control unit 44 may determine this vehicle as the second dangerous vehicle. In this case, for example, the display control unit 44 detects that a relative speed to the vehicle V of a nearby vehicle running several vehicles ahead in the same lane as the vehicle V is equal to or higher than a predetermined value in a direction approaching the vehicle V, the display control unit 44 determines the nearby vehicle as the second dangerous vehicle. Because the second dangerous vehicle as described increases a risk of collision between the other vehicle and the vehicle V, the display control unit 44 displays it in a different display content from other nearby vehicles so that the occupant can easily recognize it. The determining method of the second dangerous vehicle is not limited thereto.

Moreover, the display control unit 44 displays the first dangerous vehicle and the second dangerous vehicle in different display contents. FIG. 6 illustrates an example of the first image PB when a nearby vehicle running ahead of the vehicle V in a lane on a side of the vehicle V is moving toward the lane of the vehicle V. FIG. 7 illustrates an example of the first image PB after the nearby vehicle has moved to the lane of the vehicle V. As illustrated in FIG. 6, the display control unit 44 determines, as the second dangerous vehicle, a vehicle that is traveling ahead of the vehicle V in a lane on a side of the vehicle V and that is moving toward the lane of the vehicle V, and displays it as a nearby vehicle image B3a. The nearby vehicle image B3a is displayed in a different display content from the nearby vehicle image B3. For example, the nearby vehicle image B3a is displayed in a different color from the nearby vehicle image B3 that is not determined as a dangerous vehicle. The nearby vehicle image B3a is displayed, for example, in yellow, and the nearby vehicle image B3 not determined as a dangerous vehicle may be displayed in, for example, gray, black, blue, or the like.

As a result of the second dangerous vehicle entering the lane of the vehicle V, the vehicle V may decelerate and a distance to a vehicle behind may be shortened. As illustrated in FIG. 7, the display control unit 44 determines, as the nearby vehicle image B3b, a vehicle therebehind whose distance from the vehicle V is equal to or less than a threshold, to display it. The nearby vehicle image B3b indicating the first dangerous vehicle is displayed in a different display content from the nearby vehicle image B3 not determined as a dangerous vehicle. Furthermore, the nearby vehicle image B3b indicating the first dangerous vehicle is displayed in a different display content also from the nearby vehicle image B3a indicating the second dangerous vehicle. For example, the nearby vehicle image B3b is displayed in a different color from the nearby vehicle image B3a indicating the nearby vehicle image B3 not determined as a dangerous vehicle, and the nearby vehicle image B3a indicating the second dangerous vehicle. The nearby vehicle image B3b may be displayed, for example, in red.

The display control unit 44 displays the first image PB on the display unit 22 in this way, but the first image PB described above is only one example, and the display content of the first image PB are not limited what is explained above.

Next, the second image PC will be explained. FIG. 8 to FIG. 12 are diagrams illustrating an example of the second image. The display control unit 44 displays the second image PC when the switching information indicates the vehicle V is in the automatic driving mode, and the driving state information in the switching information indicates the second state. That is, the display control unit 44 displays the second image PC when the vehicle V is running in the automatic driving mode, and the degree of anxiety of the occupant about the automated driving is small. The second image PC is an image showing a nearby vehicle.

The second image PC is an image having a smaller amount of information than the first image PB. The amount of information here refers to an amount of information on a nearby vehicle to be displayed. That is, the second image PC displays less information on the nearby vehicle than the first image PB. To be more specific, when assuming that the first image PB and the second image PC are displayed under the same state of the vehicle V, that is, under the same relative positional relation between the vehicle V and the nearby vehicles, the number of nearby vehicles shown in the second image PC is smaller than the number of nearby vehicles shown in the first image PB. In the present embodiment, the second image PC is an image showing a front side of the vehicle V, and is regarded as an image showing the nearby vehicles viewed from a viewpoint looking forward in a traveling direction of the vehicle V. The display control unit 44 detects a positional relation between the vehicle V and the nearby vehicle based on the position of the nearby vehicle relative to the vehicle V acquired by the vehicle-information acquiring unit 40, and on the distance between the vehicle V and the nearby vehicle. The display control unit 44 then generates an image as the second image PC assuming that the nearby vehicle is viewed from a viewpoint looking forward in the traveling direction of the vehicle V, based on the positional relation between the vehicle V and the nearby vehicle, and displays it on the display unit 22. Because the second image PC is an image showing the nearby vehicles from a viewpoint looking forward from the vehicle V, the second image PC includes an image of the nearby vehicle positioned in a range ahead of the vehicle V in the traveling direction, but does not include an image of a nearby vehicle positioned in a range behind the vehicle V in the traveling direction. That is, with respect to the second image PC, an amount of information on nearby vehicles to be shown, i.e., the number of nearby vehicles to be shown in this example, is smaller than the first image PB as an image of a nearby vehicle positioned in the range behind the vehicle V in the traveling direction is not included.

Figure 8:
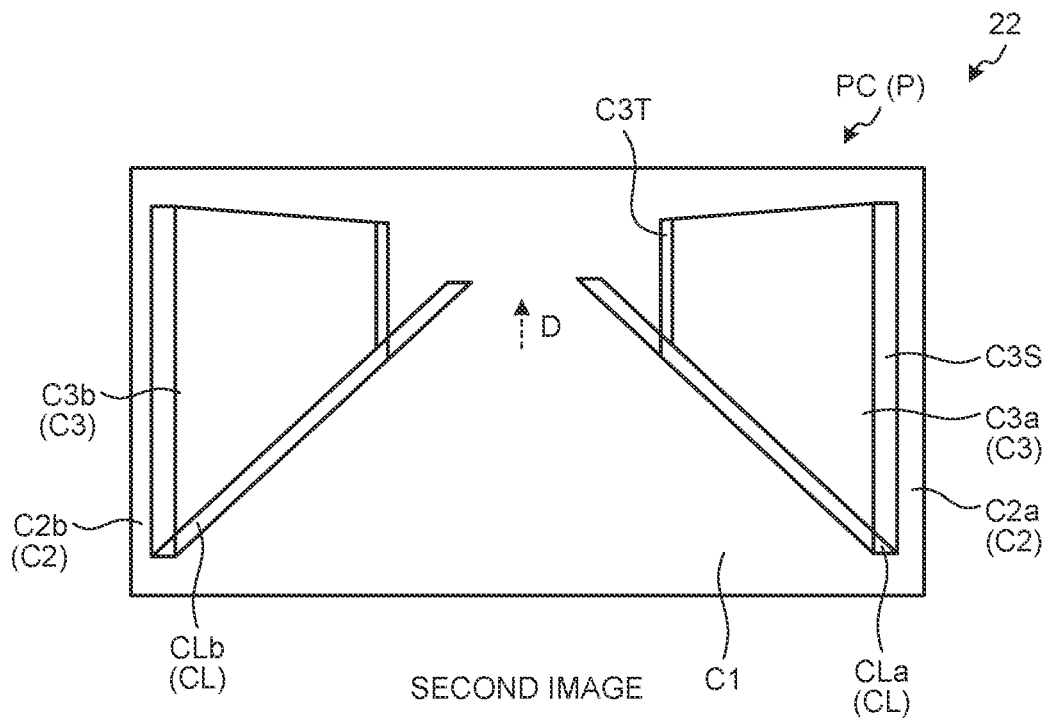
FIG. 8 is a diagram illustrating an example of a second image.
Figure 9:
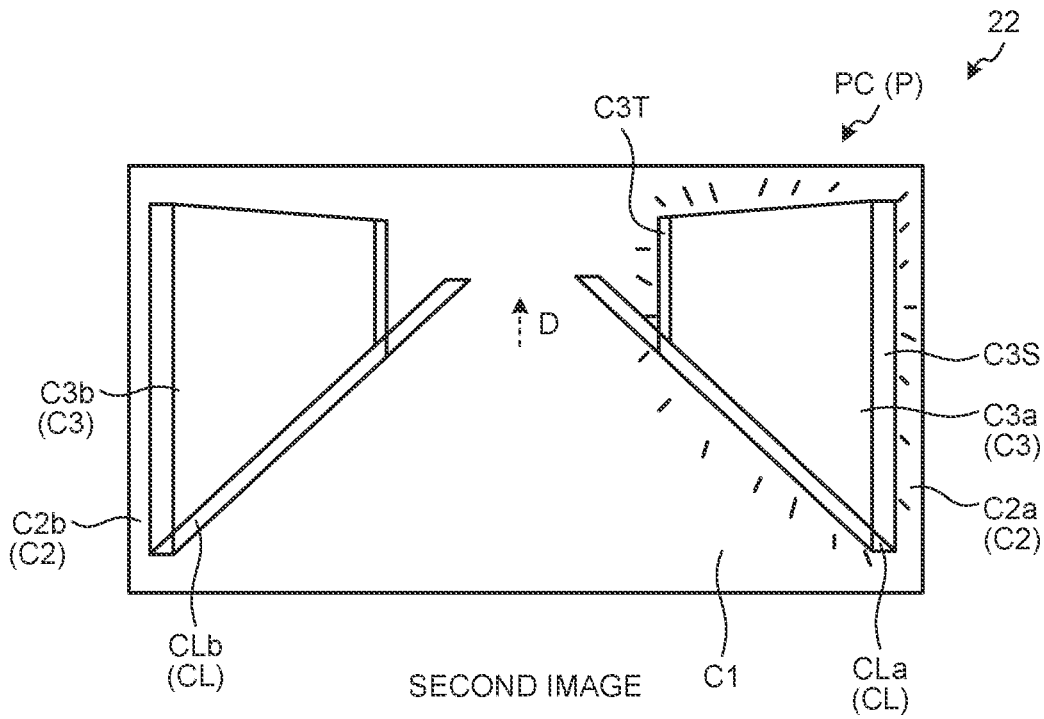
FIG. 9 is a diagram illustrating an example of the second image.

FIG. 8 and FIG. 9 illustrate the second image PC when a nearby vehicle is not shown therein. As illustrated in FIG. 8, the second image PC includes an own lane image C1, side lane images C2, and environment information images C3. In the present embodiment, the vehicle V, which is its own vehicle, is not included in the second image PC.

The own lane image C1 is an image showing a route on which the vehicle V is running. The side lane images C2 are images showing routes present on sides of the route on which the vehicle V is running. The display control unit 44 calculates a width of the route on which the vehicle V is running based on a width of the vehicle, and sets an area obtained by extending, in a traveling direction D, the width of the route on which the vehicle V is running, as the route on which the vehicle V is running. The display control unit 44 causes the display unit 22 to display the set route on which the vehicle V is running as the own lane image C1. For example, the display control unit 44 sets a width wider on both sides by a predetermined length than the width of the vehicle V, as a width of the route in which the vehicle is running. Alternatively, when lanes are set on a road with white lines or the like, the display control unit 44 may set an area between white lines on both sides of the lane in which the vehicle V is running, as the own lane image C1. The display control unit 44 generates and displays the side lane images C2 such that the side lane images C2 are positioned on sides of the own lane image C1 thus generated. In the example in FIG. 8, the side lane images C2 include a side lane image C2a on one side of the own lane image C1 and a side lane image C2b on the other side. However, the number of the side lane images C2 is not limited thereto, and it is set according to a road on which the vehicle V is running. For example, when there are two lanes, the side lane image C2 may be one.

The environment information images C3 are images showing states of nearby vehicles on sides of the vehicle V, and are displayed on sides of the own vehicle V, in other words, on sides of the own lane image C1. A portion corresponding to a side on a side of the own lane image C1 (route in which the vehicle V is running) is denoted by side CL. The side CL can also be regarded as a portion indicating a boundary between the own lane image C1 and the side lane image C2. The environment information image C3 is formed along the side CL. Specifically, the environment information image C3 is formed as an image of a virtual wall extending in a vertically upward direction in the second image PC from the side CL. The environment information image C3 extends from an end portion C3S to an end portion C3T toward ahead in the traveling direction D of the vehicle V. Therefore, the environment information image C3 is displayed as a wall-shaped image shielding a side of the own lane image C1 (route in which the vehicle V is running) from the end portion C3S to the end portion C3T. The end portion C3S may be set at an arbitrary position in the traveling direction D of the vehicle V and, for example, it may be set at a position same as a distal end portion of the vehicle V in the traveling direction of the vehicle V. Moreover, the end portion C3T may be set to an arbitrary position more ahead in the traveling direction D of the vehicle V than the end portion C3S. Because the environment information image C3 is displayed as an image having a predetermined transparency, a nearby vehicle image C4 described later on the side lane image C2 is visible even when it is at a position overlapping on the environment information image C3. Moreover, in the example in FIG. 8, because the respective side lane images C2a, C2b are arranged on both sides of the own lane image C1, the environment information images C3 include an environment information image C3a formed between the own lane image C1 and the side lane image C2a, and an environment information image C3b formed between the own lane image C1 and the side lane image C2b.

Figure 10:
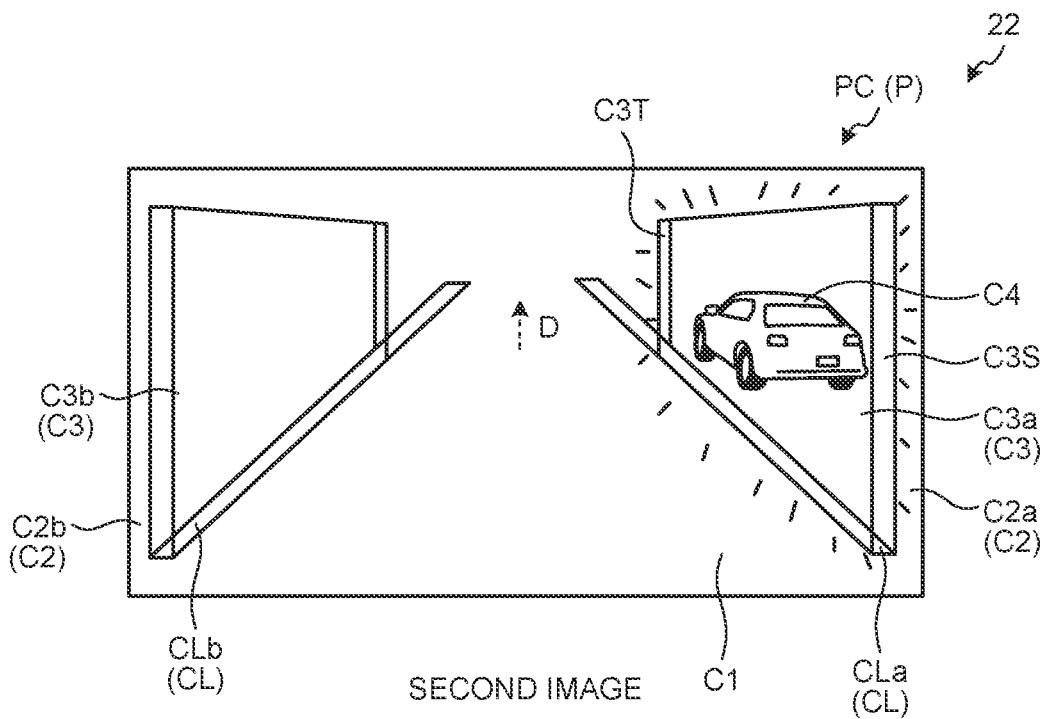
FIG. 10 is a diagram illustrating an example of the second image.
Figure 11:
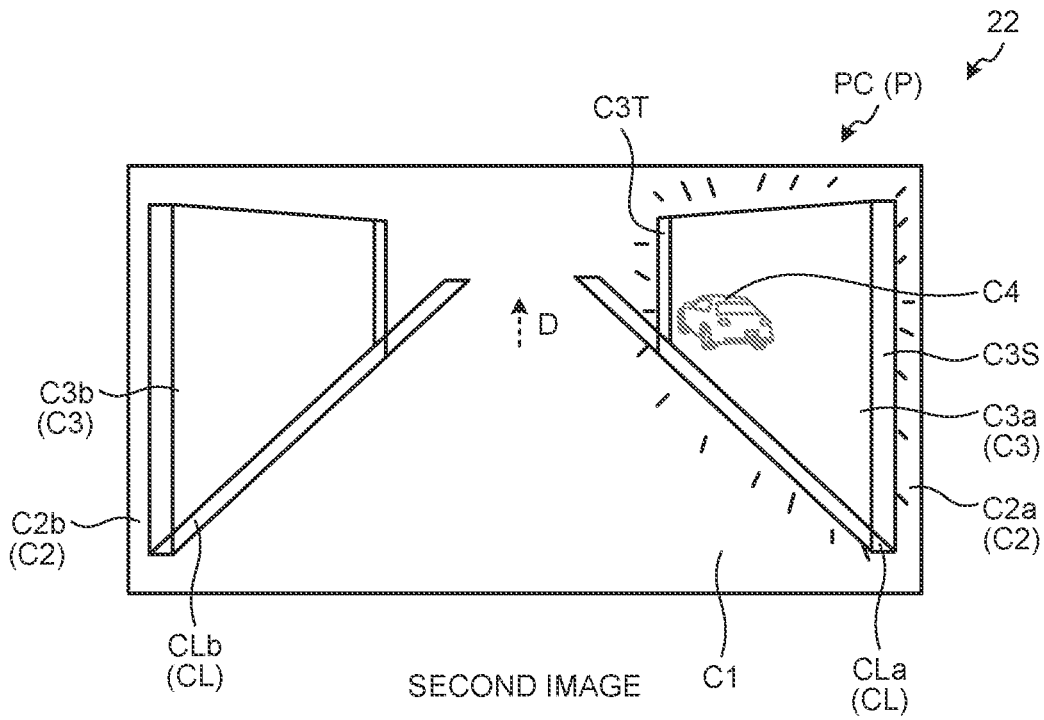
FIG. 11 is a diagram illustrating an example of the second image.
Figure 12:
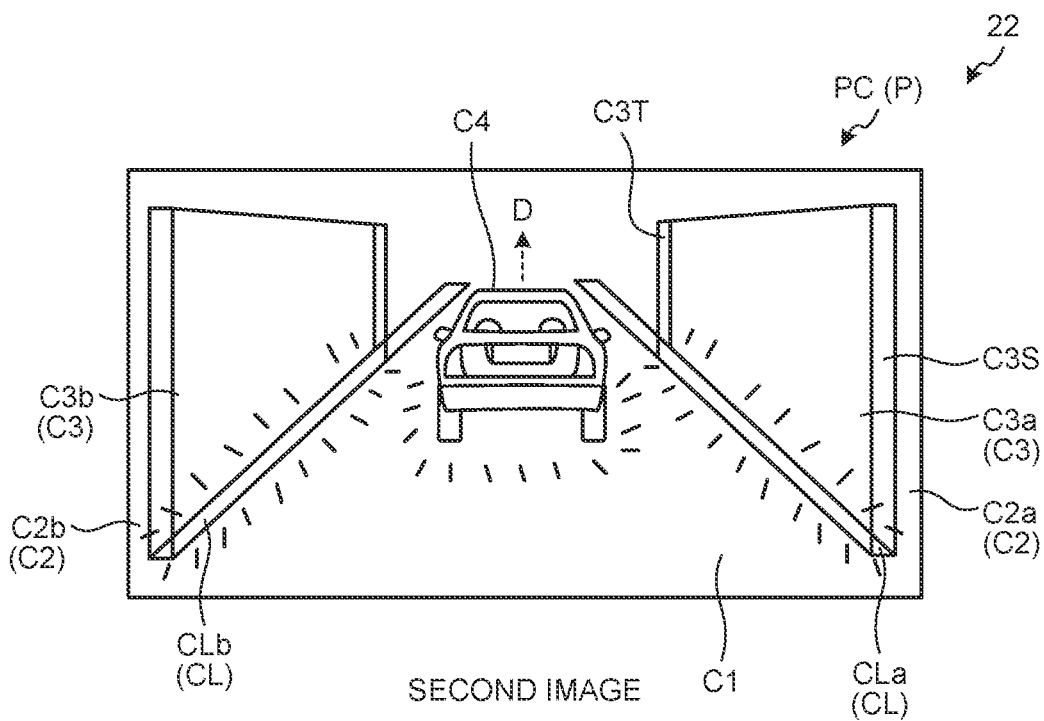
FIG. 12 is a diagram illustrating an example of the second image.

FIG. 10 to FIG. 12 illustrate the second image PC when there is a nearby vehicle ahead of the vehicle V. As illustrated in FIG. 10, the second image PC includes the nearby vehicle image C4. The nearby vehicle C4 is an image illustrating a nearby vehicle. The display control unit 44 displays the nearby vehicle image C4 to overlap the own lane image C1 or the side lane image C2. For example, the nearby vehicle image C4 is displayed as an image representing a shape of a vehicle. The display control unit 44 calculates a position of the nearby vehicle in a range displayed as the second image PC, that is, a position of the nearby vehicle positioned in an area ahead of the vehicle V in the traveling direction D relative to the vehicle V in the second image PC, based on a positional relation between the vehicle V and the nearby vehicle. The display control unit 44 displays the nearby vehicle image C4 at the calculated position of the nearby vehicle on the second image PC. In this case, the display control unit 44 displays a vehicle positioned in an area ahead of the vehicle V in the traveling direction D, and in a predetermined display distance range from the vehicle V, as the nearby vehicle image C4. That is, the display distance indicates an upper limit of a distance between the nearby vehicle and the vehicle V when the nearby vehicle is displayed as the nearby vehicle image C4. As described above, a vehicle present within the detection distance range relative to the vehicle V is detected as a nearby vehicle. The display distance in the present embodiment may be arbitrarily set, but it may be set to, for example, shorter than the detection distance. That is, the display control unit 44 may display a nearby vehicle present within the display distance range as the nearby vehicle image C4, among nearby vehicles in the area ahead of the vehicle V in the traveling direction D. The display distance may be set to the same length as the detection distance, and in this case, the display control unit 44 displays all of the nearby vehicles in the area ahead of the vehicle V in the traveling direction D as the nearby vehicle image C4. In either case, the display control unit 44 displays a nearby vehicle in the area ahead of the own vehicle image B0 in the traveling direction D as the nearby vehicle image B3.

The display control unit 44 changes display contents of the environment information image C3 and the nearby vehicle image C4 according to a positional relation between the vehicle V and a nearby vehicle. The environment information image C3 is displayed on the second image PC irrespective of presence or absence of a nearby vehicle or display of the nearby vehicle image C4, but display contents are changed according to a distance between the nearby vehicle and the vehicle V. The display control unit 44 makes display contents of the environment information image C3 different between the first state in which a nearby vehicle on a side of the vehicle V is close to the vehicle V, and the second state in which a nearby vehicle on a side of the vehicle V is far from the vehicle V. In the present embodiment, the first state indicates a state in which the distance between a nearby vehicle and the vehicle V is within a predetermined distance range, and the second state indicates a state in which the distance between a nearby vehicle and the vehicle V is out of the predetermined distance range. That is, when a nearby vehicle on a side of the vehicle V is within the predetermined distance range, the display control unit 44 displays the environment information image C3 on the side on which the nearby vehicle is positioned in a first mode, and when a nearby vehicle on a side of the vehicle V is out of the predetermined distance range, the display control unit 44 displays the environment information image C3 on the side on which the nearby vehicle is positioned in a second mode different from the first mode. That is, for example, when a nearby vehicle on one side (for example, right side) is present within the predetermined distance range, the environment information image C3a on one side (for example, right side) is displayed in the first mode. The first mode and the second mode may be any display modes as long as the display contents differ from each other, but the display control unit 44 makes colors different between the first mode and the second mode in the present embodiment. For example, the display control unit 44 may display the environment information image C3 in the first mode in red, and the environment information image C3 in the second mode in blue. Moreover, for example, the display control unit 44 may flash the environment information image C3 in the first mode, and may display the environment information image C3 in the second mode not flashing.

The display control unit 44 displays the environment information image C3 in the first mode when a nearby vehicle is within the predetermined distance range, regardless of a position of the nearby vehicle on a side relative to the vehicle V. That is, the display control unit 44 displays the environment information image C3 in the first mode when a nearby vehicle on a side is present within the predetermined distance range, in either case in which it is positioned in the area behind the vehicle V or in the area ahead the vehicle V. Moreover, the predetermined distance herein may be arbitrarily set but, for example, it may be set to the same length as a display distance indicating the maximum distance displaying the nearby vehicle image C4.

FIG. 8 to FIG. 11 illustrate an example of the second image PC when a nearby vehicle approaches the vehicle V from behind on one side of the vehicle V (right side in this example), and the nearby vehicle passes and goes away from the vehicle V toward ahead. FIG. 8 illustrates a state in which the nearby vehicle is positioned behind the vehicle V on a lane on one side of the vehicle V. Because the display control unit 44 does not show the nearby vehicle in the area behind the vehicle V, the nearby vehicle image C4 is not shown in the second image PC illustrated in FIG. 8. In the example in FIG. 8, the nearby vehicle on one side of the vehicle V is positioned out of the predetermined distance range in the area behind the vehicle V. Therefore, the environment information image C3 illustrated in FIG. 8 is displayed in the second mode. Moreover, because there is no vehicles positioned within the predetermined distance range on the other side of the vehicle V either, the environment information image C3*b* illustrated in FIG. 8 is also displayed in the second mode.

FIG. 9 illustrates a state in which the nearby vehicle in the lane on one side of the vehicle V comes closer to the vehicle V than the state in FIG. 8, and has reached a position within the predetermined distance range. Because the vehicle V is behind the vehicle V even in FIG. 9, the nearby vehicle C4 is not displayed in the nearby vehicle image C4. On the other hand, this nearby vehicle is positioned in the predetermined distance range in the area behind the vehicle V. Therefore, the environment information image C3*a* illustrated in FIG. 9 displayed in the first mode. In this way, in the second image PC, when a vehicle is approaching, the environment information image C3*a* on the side of the vehicle is displayed in the first mode. Therefore, an occupant can recognize that the vehicle is approaching.

FIG. 10 illustrates a state in which the nearby vehicle in the lane on one side of the vehicle V passes the vehicle V. That is, FIG. 10 illustrates an example in which a nearby vehicle is present within a range ahead of the vehicle V on one side of the vehicle V. In FIG. 10, because this nearby vehicle is positioned in the display distance range from the vehicle V, it is displayed as the nearby vehicle image C4 on the side lane image C2*a* of one side. Moreover, because this nearby vehicle is positioned within the predetermined distance range from the vehicle V, the environment information image C3*a* is displayed in the first mode.

FIG. 11 illustrates a state in which the nearby vehicle in the lane on one side of the vehicle V is farther from the vehicle V than in the state in FIG. 10. Also in FIG. 11, because this nearby vehicle is positioned within the predetermined distance range from the vehicle V, the environment information image C3*a* is displayed in the first mode. Furthermore, also in FIG. 11, this nearby vehicle is positioned within the display distance range from the vehicle V, it is displayed as the nearby vehicle image C4. However, in the present embodiment, the display control unit 44 changes display contents of the nearby vehicle image C4 according to a distance between the nearby vehicle and the vehicle V. Herein, the display control unit 44 increases transparency of the nearby vehicle image C4 as the nearby vehicle goes further away from the vehicle V. That is, the closer the nearby vehicle is to the vehicle V, the less transparent the nearby vehicle image C4 is to be easier to be visually recognized, and the farther the nearby vehicle is from the vehicle V, the more transparent the nearby vehicle image C4 becomes to be difficult to be visually recognized. Then, when the distance between the nearby vehicle and the vehicle V becomes longer than the display distance, the display control unit 44 maximizes the transparency of the nearby vehicle image C4 such that the nearby vehicle image C4 is not shown. In FIG. 11, the nearby vehicle is further away from the vehicle V than in the state in FIG. 10, but the nearby vehicle is positioned within the display distance range. Therefore, the nearby vehicle image C4 in FIG. 11 has higher transparency than the nearby vehicle image C4 in FIG. 10, but it is not completely transparent, and is displayed translucently.

When the nearby vehicle in the lane on one side of the vehicle V further goes away from the vehicle V from the state in FIG. 11, the second image PC is displayed as in FIG. 8. That is, in this case, because the nearby vehicle is positioned out of the predetermined distance range from the vehicle V, the environment information image C3*a* is switched from the first mode to the second mode and is displayed. Moreover, in this case, because the nearby vehicle is positioned out of the display distance range from the vehicle V ahead in the traveling direction of the vehicle V, the nearby vehicle image C4 becomes completely transparent and is not shown.

When the length from the end portion C3S to the end portion C3T of the environment information image C3 is wall length, the wall length may be set arbitrarily, but may be, for example, the same length as the display distance in which the nearby vehicle image C4 is displayed. In this case, when the nearby vehicle ahead of the vehicle V moves forward ahead of the end portion C3T, the nearby vehicle image C4 of the nearby vehicle is not displayed, and the environment information image C3 is switched from the first mode to the second mode.

In the explanation of FIG. 8 to FIG. 11, an example of the change of the second image PC when there is a nearby vehicle on a side of the vehicle has been described. On the other hand, FIG. 12 illustrates an example of the second image PC when there is a nearby vehicle in the same lane as the vehicle V. Even when a nearby vehicle is present in the same lane as the vehicle V, the change of display contents of the nearby vehicle image C4 is same as the change illustrated in FIG. 8 to FIG. 11. That is, the nearby vehicle image C4 displays a nearby vehicle in the area ahead of the vehicle V and within the display distance range, and as it goes away from the vehicle V, the transparency becomes higher. On the other hand, when there is a nearby vehicle in the same lane as the vehicle V, display contents of the side CL changes instead of the environment information image C3 on the side. That is, when a nearby vehicle is present within the predetermined distance range in the same lane as the vehicle V, the display control unit 44 displays the side CL in the first mode, and when a nearby vehicle is present out of the predetermined distance range in the same lane as the vehicle V, the display control unit 44 displays the side CL in the second mode. The first mode and the second mode of the side CL may be any display modes as long as the display contents differ from each other, but in the present embodiment, the display control unit 44 makes the first mode and the second mode different in color. For example, the display control unit 44 may display the side CL in the first mode in red, and may display the side CL in the second mode in blue.

FIG. 12 illustrates an example in which a nearby vehicle ahead of and in the same lane as the vehicle V is present within the predetermined distance range. In this case, sides CL*a*, CL*b* are displayed in the first mode. Moreover, because the nearby vehicle in the same lane as and ahead of the vehicle V is present within the display distance range, the nearby vehicle image C4 is displayed on the own lane image C1. In this case, the nearby vehicle image C4 may be of different display contents, such as flashing. When the nearby vehicle in the same lane as and ahead of the vehicle V is present out of the predetermined distance range, the sides CLa, CLb are displayed in the second mode, for example, as illustrated in FIG. 8.

As described above, display contents of the side CL changes according to the distance between a nearby vehicle in the same lane as the vehicle V and the vehicle V. That is, the environment information image C3 can be regarded as an environment information image showing a state of a nearby vehicle on a side of the vehicle V, and the side CL can be regarded as an environment information image showing a state of a nearby vehicle in the same lane as the vehicle V.

The display control unit 44 displays the second image PC on the display unit 22 in this way, but the second image PC explained above is one example, and display contents of the second image PC are not limited to what is explained above.

As explained above, the display control unit 44 displays the manually-operated driving image PA, the first image PB, and the second image PC in a switching manner according to the switching information. Preferably, the display control unit 44 seamlessly switches among the manually-operated driving image PA, the first image PB, and the second image PC. In the above explanation, the display control unit 44 displays the manually-operated driving image PA in the manually-operated driving mode, and displays the first image PB and the second image PC in the automatic driving mode. However, the driving modes in which the manually-operated driving image PA, the first image PB, and the second image PC are displayed are not limited thereto. For example, the manually-operated driving image PA, the first image PB, and the second image PC may be switched thereamong in the manually-operated driving mode, or alternatively, the manually-operated driving image PA, the first image PB, and the second image PC may be switched thereamong in the automatic driving mode. Moreover, the vehicle V is not limited to be a vehicle that can switch between the manually-operated driving mode and the automatic driving mode, but may be, for example, a vehicle that is not capable of automated driving. In such a vehicle, determination as to whether it is in the first state or the second state may be made not based on the degree of anxiety of an occupant about the automated driving, but on how much the occupant desires to grasp its surroundings.

Furthermore, in the present embodiment, the entire display device including the control unit 30 is mounted on the vehicle V. However, for example, the control unit 30 may be configured as a display control device separate from the display device 10, and be arranged outside the vehicle V. In this case, the display unit 22 receives an image by communication from the control unit 30 arranged outside the vehicle V, to display it. Moreover, at least a part of the vehicle-information acquiring unit 40, the switching-information acquiring unit 42, and the display control unit 44 may not be provided in the vehicle V.

Figure 13:
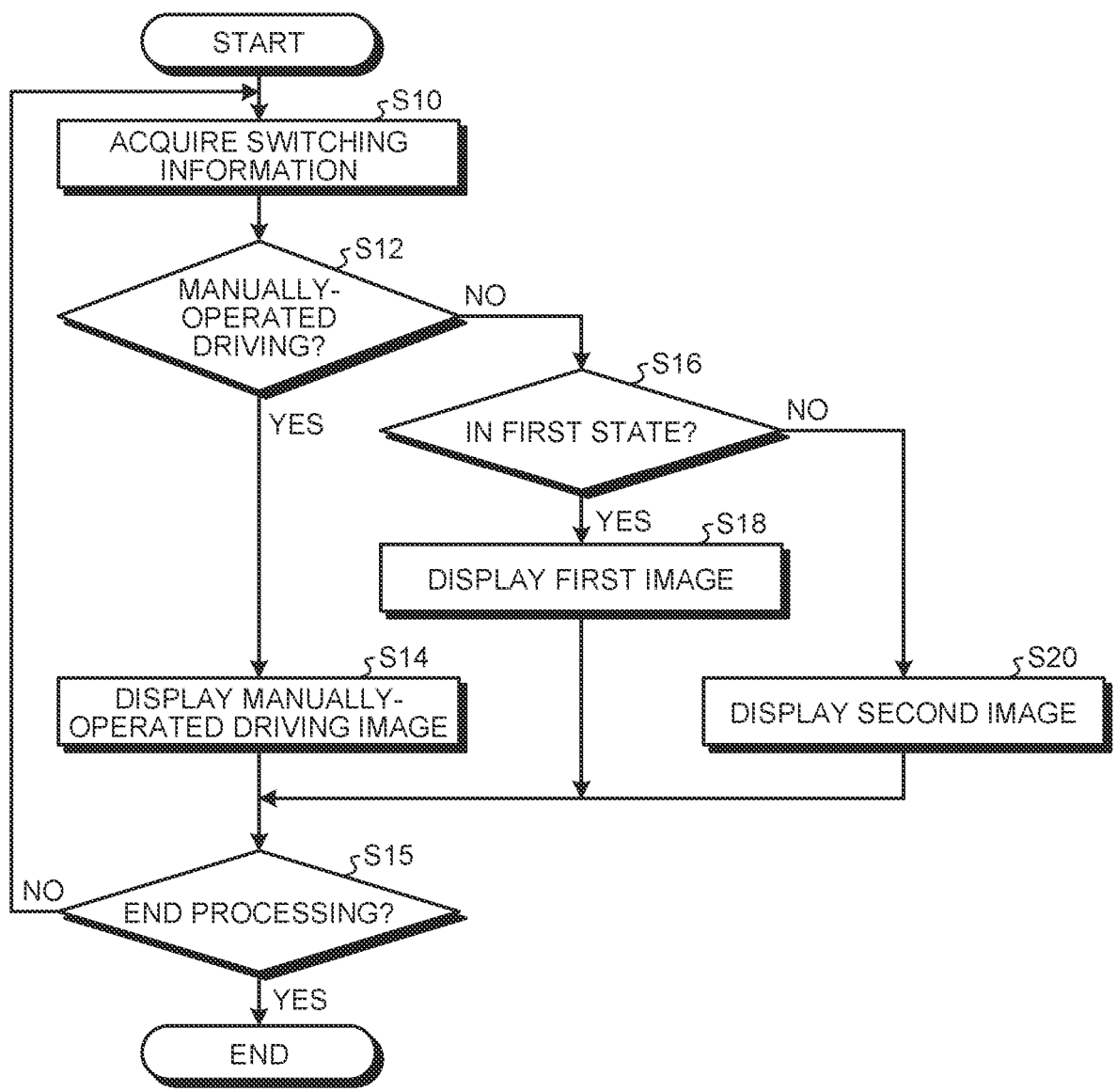
FIG. 13 is a flowchart explaining an image switching flow according to the present embodiment.

Next, an image switching flow by the display device 10 will be explained based on a flowchart. FIG. 13 is a flowchart for explaining the image switching flow according to the present embodiment. As illustrated in FIG. 13, the control unit 30 acquires the switching information by the switching-information acquiring unit 42 (step S10). The switching-information acquiring unit 42 acquires the driving mode information indicating whether the vehicle V is in the manually-operated driving mode or the automatic driving mode, and traveling state information indicating whether the vehicle V is in the first state or the second state, as the switching information. The control unit 30 determines whether the vehicle V is in the manually-operated driving mode or the automatic driving mode based on the switching information (step S12), and when it is in the manually-operated driving mode (step S12: YES), the display control unit 44 causes the display unit 22 to display the manually-operated driving image PA (step S14). At step S14, for example, when the first image PB or the second image PC is currently being displayed, the display control unit 44 switches display contents of the image P from the first image PB or the second image PC to the manually-operated driving image PA seamlessly.

On the other hand, when it is not in the manually-operated driving mode (step S12: NO), that is, when it is in the automatic driving mode, the control unit 30 determines whether the vehicle V is in the first state or the second state based on the switching information (step S16). When it is in the first state (step S16: YES), the control unit 30 causes the display control unit 44 to display the first image PB on the display unit 22 (step S18). At step S18, for example, when the manually-operated driving image PA or the second image PC is currently being displayed, the display control unit 44 switches from the manually-operated driving image PA or the second image PC to the first image PB seamlessly. On the other hand, when it is not in the first state (step S16: NO), that is, when it is in the second state, the control unit 30 causes the display control unit 44 to display the second image PC on the display unit 22 (step S20). At step S20, for example, when the manually-operated driving image PA or the first image PB is currently being displayed, the display control unit 44 switches display contents of the image P from the manually-operated driving image PA or the first image PB to the second image PC seamlessly. When steps S14, S18, and S20 have been performed, it proceeds to step S15, and when the processing is ended (step S15: YES), the processing is ended, and when it is not ended (step S15: NO), it returns to step S10, to continue the processing.

As explained above, the control unit 30 as the display control device according to the present embodiment includes the vehicle-information acquiring unit 40 configured to acquire information about at least one nearby vehicle close to the vehicle V; and the display control unit 44 configured to display an image showing the nearby vehicle based on the information about the nearby vehicle. The display control unit 44 displays, in a switching manner, the first image PB showing the nearby vehicle and the second image PC showing the nearby vehicle having a smaller amount of information than the first image PB. When the information about the nearby vehicle is displayed on the display unit 22 mounted on the vehicle V, it is required to display information on a nearby vehicle appropriately according to a state of the vehicle V. The control unit 30 according to the present embodiment displays, in a switching manner, the first image PB showing the nearby vehicle and the second image PC showing the nearby vehicle having a smaller amount of information than the first image PB. Therefore, according to the present embodiment, the first image PB and the second image PC can be switched according to a state of the vehicle V, and the amount of information on the nearby vehicle to be provided to an occupant can be made different according to the state of the vehicle V. Therefore, according to the control unit 30 according to the present embodiment, the information on the nearby vehicle can be displayed appropriately according to the state of the vehicle V.

Furthermore, for example, when the vehicle V is running in the automatic driving mode, an occupant may feel anxious about automated driving, or may have less anxiety, and thus, the state of the vehicle V may change. For example, when an occupant feels anxious about automated driving, the occupant tends to want to obtain much information on nearby vehicles even if it is in the automatic driving mode. On the other hand, when the occupant does not feel anxious about the automated driving, the occupant tends to think that it is unnecessary to acquire so much information on nearby vehicles. Because the control unit 30 according to the embodiment can switch between the first image PB and the second image PC, for example, it is possible to provide much information about nearby vehicles by displaying the first image PB when an occupant feels anxious about automated driving, and to reduce the amount of information about nearby vehicles by displaying the second image PC when the occupant does not feel anxious about the automated driving. Therefore, according to the control unit 30 of the present embodiment, it is particularly beneficial to the vehicle V that performs automated driving.

Moreover, the display control unit 44 displays the second image PC such that the number of nearby vehicles shown in the second image PC is less than the number of nearby vehicles shown in the first image PB that is to be displayed under the same state of the vehicle V. According to the control unit 30 of the present embodiment, because the number of nearby vehicle to be shown can be changed according to a state of the vehicle V, information on nearby vehicles can be displayed appropriately according to a state of the vehicle V.

Furthermore, the display control unit 44 displays, as the first image, an image showing the nearby vehicle viewed from a viewpoint looking down on the vehicle from above in a vertical direction, and displays, as the second image PC, an image showing the nearby vehicle viewed from a viewpoint looking forward in the traveling direction D from the vehicle V. According to the control unit 30 of the present embodiment, by generating the first image PB as a bird's-eye view, for example, when an occupant feels anxious about automated driving, by providing information on the nearby vehicles in an entire surrounding of the vehicle V to the occupant, the occupant can obtain sufficient information on the nearby vehicles, and as a result, it facilitates to ease the anxious feeling. On the other hand, according to the control unit 30, by generating the second image PC as an image showing the nearby vehicle viewed from a viewpoint looking forward, for example, when an occupant does not feel anxious about automated driving, it is possible to suppress the possibility that the occupant feels information overload, by reducing the information on the nearby vehicles.

Moreover, the display control unit 44 increases transparency of the nearby vehicle image C4 (image of a nearby vehicle) as the nearby vehicle goes further away from the vehicle V in the second image PC, and causes the nearby vehicle to be not shown when the distance between the nearby vehicle and the vehicle V becomes a predetermined distance or longer. According to the control unit 30, because the transparency of the nearby vehicle image C4 is increased as the nearby vehicle goes further away, it is possible to let the occupant recognize a nearby vehicle appropriately, and to suppress the possibility that the occupant feels information overload, by reducing the information on the nearby vehicles.

Furthermore, the display control unit 44 displays the environment information image showing a state of the nearby vehicle in the second image PC. According to the control unit 30, by displaying the environment information image, it is possible to let the occupant recognize the nearby vehicles appropriately, and to suppress the possibility that the occupant feels information overload.

Moreover, the display control unit 44 makes a display content of the environment information image different between the first state in which the nearby vehicle is close to the vehicle V and the second state in which the vehicle V is farther from the vehicle V than in the first state. According to the control unit 30, by making the environment information image different depending on whether nearby vehicle is near or far, it is possible to let the occupant recognize a nearby vehicle appropriately, and to suppress the possibility that the occupant feels information overload.

The display control unit 44 displays the environment information image C3 as an image of a virtual wall that is provided on a side, and that indicates a state of the nearby vehicle on a side of the vehicle V. As the environment information image C3 is displayed as a virtual wall on a side of the vehicle V in this way, an occupant can have an image that a route on which the vehicle V is traveling is surrounded by walls and is safe, or can recognize that there is a vehicle around by changing display contents of the wall. Therefore, according to the control unit 30, information on the nearby vehicles can be appropriately displayed according to a state of the vehicle V.

Furthermore, the display control unit 44 displays, in the first image PB, a dangerous vehicle that is a nearby vehicle increasing a risk of collision of the vehicle V with another vehicle, in different display contents from other nearby vehicles. According to the control unit 30, by making display contents of a dangerous vehicle different in the first image PB, for example, when an occupant feels anxious about automated driving, it is possible to provide information on the nearby vehicles more appropriately.

Moreover, the display control unit 44 displays the first image PB and the second image PC in a switching manner, according to a traveling state of the vehicle V when the vehicle V is in the automatic driving mode. According to the control unit 30, by displaying the first image PB and the second image PC in a switching manner in the automatic driving, it is possible to provide information on the nearby vehicles appropriately according to a state of the vehicle V in the automatic driving.

Furthermore, the display control unit 44 displays, in a switching manner, the first image PB, the second image PC, and the manually-operated driving image PA as a third image. The manually-operated driving image PA includes the route information indicating a route on which the vehicle V is traveling. The display control unit 44 displays the manually-operated driving image PA when the vehicle V is in the manually-operated driving mode. According to the control unit 30, by switching images between the manually-operated driving mode and in the automatic driving mode in this way, it is possible to provide information on surroundings of the vehicle V appropriately.

Moreover, the display device 10 according to the present embodiment includes the control unit 30 as a display control device, and the display unit 22 that is mounted on the vehicle V, and that displays the first image PB and the second image PC in a switching manner. Because this display device 10 displays, in a switching manner, the first image PB and the second image PC according to a state of the vehicle V, it is possible to display information on the nearby vehicles according to a state of the vehicle V.

According to the present embodiment, information about a surrounding vehicle can be displayed appropriately.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A display control device comprising:
    a vehicle-information acquiring unit configured to acquire information on at least one nearby vehicle close to a vehicle; and
    a display control unit configured to display an image showing the nearby vehicle based on the information on the nearby vehicle,
    wherein the display control unit displays, in a switching manner, a first image showing the nearby vehicle and a second image showing the nearby vehicle having a smaller amount of information than the first image,
    wherein the display control unit displays the first image and the second image in the switching manner according to a driving state of the vehicle when the vehicle is in an automatic driving mode, and
    wherein the display control unit displays, in the switching manner, the first image, the second image, and a third image that includes route information indicating a route on which the vehicle travels, and displays the third image when the vehicle is in a manually-operated driving mode.

2. The display control device according to claim 1, wherein the display control unit displays the second image such that number of nearby vehicles shown in the second image is less than number of nearby vehicles shown in the first image that is to be displayed under same relative positional relation between the vehicle and the nearby vehicles.

3. The display control device according to claim 2, wherein the display control unit displays, as the first image, an image showing the nearby vehicle viewed from a viewpoint looking down on the vehicle from above in a vertical direction, and displays, as the second image, an image showing the nearby vehicle viewed from a viewpoint looking forward in a traveling direction of the vehicle.

4. The display control device according to claim 1, wherein the display control unit displays an environment information image showing a state of the nearby vehicle in the second image.

5. The display control device according to claim 4, wherein the display control unit makes a display content of the environment information image different between a first state in which the nearby vehicle is close to the vehicle and a second state in which the nearby vehicle is farther from the vehicle than in the first state.

6. The display control device according to claim 4, wherein the display control unit displays the environment information image as an image of a virtual wall that is provided on a side of the vehicle, and that indicates a state of the nearby vehicle on a side of the vehicle.

7. The display control device according to claim 1, wherein the display control unit displays the nearby vehicle that increases a risk of collision of the vehicle with another vehicle in a different display content from other nearby vehicles in the first image.

8. A display control device, comprising:
    a vehicle-information acquiring unit configured to acquire information on at least one nearby vehicle close to a vehicle; and
    a display control unit configured to display an image showing the nearby vehicle based on the information on the nearby vehicle,
    wherein the display control unit displays, in a switching manner, a first image showing the nearby vehicle and a second image showing the nearby vehicle having a smaller amount of information than the first image,
    wherein the display control unit changes transparency of the image of the nearby vehicle in the second image based on a distance between the nearby vehicle and the vehicle, in the manner to increase transparency of the image of the nearby vehicle as the nearby vehicle goes further away from the vehicle in the second image, and to cause the nearby vehicle not to be shown when the distance between the nearby vehicle and the vehicle becomes a predetermined distance or larger,
    wherein the display control unit displays the first image and the second image in the switching manner according to a driving state of the vehicle when the vehicle is in an automatic driving mode, and
    wherein the display control unit displays, in the switching manner, the first image, the second image, and a third image that includes route information indicating a route on which the vehicle travels, and displays the third image when the vehicle is in a manually-operated driving mode.

9. A display device comprising:
    the display control device according to claim 1; and
    a display unit that is mounted on the vehicle, and that is configured to display the first image and the second image in a switching manner.

10. A non-transitory computer-readable recording medium containing a computer program, the computer program causing a computer to execute:
    acquiring information on at least one nearby vehicle close to a vehicle; and
    displaying an image showing the nearby vehicle based on the information on the nearby vehicle, wherein
    the displaying includes:
        displaying, in a switching manner, a first image showing the nearby vehicle and a second image showing the nearby vehicle having smaller amount of information than the first image, comprising:
            displaying the first image and the second image in the switching manner according to a driving state of the vehicle when the vehicle is in an automatic driving mode, and
            displaying, in the switching manner, the first image, the second image, and a third image that includes route information indicating a route on which the vehicle travels, and displaying the third image when the vehicle is in a manually-operated driving mode.

11. The non-transitory computer-readable recording medium according to claim 10, wherein the displaying includes changing transparency of the image of the nearby vehicle in the second image based on a distance between the nearby vehicle and the vehicle, in a manner to increase transparency of the image of the nearby vehicle as the nearby vehicle goes further away from the vehicle in the second image, and to cause the nearby vehicle to be not shown when the distance between the nearby vehicle and the vehicle becomes a predetermined distance or larger.

12. The non-transitory computer-readable recording medium according to claim 10, wherein the displaying includes displaying, in a switching manner based on biological information on an occupant of the vehicle, the first image showing the nearby vehicle and the second image showing the nearby vehicle having the smaller amount of information than the first image.

* * * * *